(12) United States Patent
Hasegawa et al.

(10) Patent No.: US 11,187,027 B2
(45) Date of Patent: Nov. 30, 2021

(54) MANUFACTURING METHOD OF GLASS PANEL UNIT AND MANUFACTURING METHOD OF GLASS WINDOW

(71) Applicant: PANASONIC INTELLECTUAL PROPERTY MANAGEMENT CO., LTD., Osaka (JP)

(72) Inventors: Kazuya Hasegawa, Osaka (JP); Masataka Nonaka, Osaka (JP); Hiroyuki Abe, Osaka (JP); Tasuku Ishibashi, Osaka (JP); Eiichi Uriu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 295 days.

(21) Appl. No.: 16/337,320

(22) PCT Filed: Sep. 26, 2017

(86) PCT No.: PCT/JP2017/034628
§ 371 (c)(1),
(2) Date: Mar. 27, 2019

(87) PCT Pub. No.: WO2018/062124
PCT Pub. Date: Apr. 5, 2018

(65) Prior Publication Data
US 2020/0032573 A1  Jan. 30, 2020

(30) Foreign Application Priority Data

Sep. 28, 2016 (JP) .............................. JP2016-190262

(51) Int. Cl.
*E06B 3/673* (2006.01)
*C03C 27/06* (2006.01)
(Continued)

(52) U.S. Cl.
CPC ............ *E06B 3/6736* (2013.01); *C03C 27/06* (2013.01); *E06B 3/663* (2013.01); *E06B 3/6775* (2013.01);
(Continued)

(58) Field of Classification Search
CPC .. E06B 3/6736; E06B 3/6775; E06B 3/67304; E06B 3/67326; E06B 3/677; E06B 3/54; E06B 3/70
See application file for complete search history.

(56) References Cited

U.S. PATENT DOCUMENTS

2014/0335291 A1  11/2014  Hasegawa et al.
2014/0356558 A1  12/2014  Hasegawa et al.
(Continued)

FOREIGN PATENT DOCUMENTS

JP  H11-311069 A  11/1999
WO  2013/132867 A1  9/2013
(Continued)

OTHER PUBLICATIONS

Machine translation of applicant cited WO 2013/132867 (Year: 2013).*
(Continued)

*Primary Examiner* — Donald J Loney
(74) *Attorney, Agent, or Firm* — McDermott Will and Emery LLP

(57) ABSTRACT

A manufacturing method of a glass panel unit includes an adhesive disposing step, a pillar disposition step of disposing a plurality of pillars on the first panel. Each of the plurality of pillars includes a plurality of resin layers to stacked on one another. In each of the plurality of pillars, a contact area being in contact with the first panel and being included in the resin layer which is in contact with the first panel is different from a contact area being in contact with
(Continued)

the second panel and being included in the resin layer which is in contact with the second panel.

7 Claims, 14 Drawing Sheets

(51) Int. Cl.
  *E06B 3/663* (2006.01)
  *E06B 3/677* (2006.01)
  *E06B 3/54* (2006.01)
(52) U.S. Cl.
  CPC ............. *E06B 3/54* (2013.01); *E06B 3/67304* (2013.01); *E06B 3/67326* (2013.01)

(56) References Cited

U.S. PATENT DOCUMENTS

| | | | |
|---|---|---|---|
| 2015/0068665 A1* | 3/2015 | Abe | ........................ C03C 27/06 156/109 |
| 2015/0068666 A1 | 3/2015 | Abe et al. | |
| 2017/0226791 A1 | 8/2017 | Hasegawa et al. | |
| 2017/0268285 A1 | 9/2017 | Abe et al. | |
| 2017/0321471 A1 | 11/2017 | Abe et al. | |
| 2018/0044235 A1 | 2/2018 | Nonaka et al. | |
| 2018/0283087 A1 | 10/2018 | Abe et al. | |

FOREIGN PATENT DOCUMENTS

| | | |
|---|---|---|
| WO | 2013/172033 A1 | 11/2013 |
| WO | 2014/136152 A1 | 9/2014 |
| WO | 2015/038391 A1 | 3/2015 |
| WO | 2016/084382 A1 | 6/2016 |
| WO | 2016/092849 A1 | 6/2016 |
| WO | 2016/147604 A1 | 9/2016 |

OTHER PUBLICATIONS

International Search Report and Written Opiinion issued in International Patent Application No. PCT/JP2017/034628, dated Jan. 9, 2018; with partial English translation.
Extended European Search Report issued in European Patent Application No. 17856075.1 dated Jul. 1, 2019.

* cited by examiner ed in the fourth step of the preparation process in a second embodiment, FIG. 10B is a view illustrating a state after the sheet material is punched in the fourth step, and FIG. 10C is a view illustrating movement of the sheet material after the sheet material is punched in the fourth step;

MANUFACTURING METHOD OF GLASS PANEL UNIT AND MANUFACTURING METHOD OF GLASS WINDOW

CROSS-REFERENCE OF RELATED APPLICATIONS

This application is the U.S. National Phase under 35 U.S.C. § 371 of International Patent Application No. PCT/JP2017/034628, filed on Sep. 26, 2017, which in turn claims the benefit of Japanese Application No. 2016-190262, filed on Sep. 28, 2016, the entire disclosures of which Applications are incorporated by reference herein.

TECHNICAL FIELD

The present invention relates to a manufacturing method of a glass panel unit and a manufacturing method of a glass window.

BACKGROUND ART

Patent Literature 1 discloses an insulated glazing. The insulated glazing disclosed in Patent Literature 1 includes a first panel, a second panel disposed to face the first panel, and a sealing member for hermetically bonding the first panel and the second panel together. The insulated glazing further includes a plurality of pillars (spacers) disposed in contact with the first panel and the second panel in an inside space hermetically closed by the first panel, the second panel, and the sealing member, the inside space serving as a reduced-pressure space.

When the first panel and the second panel receive an atmospheric pressure, the first panel and the second panel attempt to warp in a direction in which the first panel and the second panel approach each other. The pillars are in contact with both the first panel and the second panel which attempt to warp, and the pillars maintain the space between the first panel and the second panel.

Each pillar preferably has a large cross-sectional area in terms of maintenance of the inside space. However, as the cross-sectional area of each pillar increases, the quantity of heat conducted via each pillar increases. Therefore, the cross-sectional area is preferably small in terms of a reduction in thermal conduction. Thus, it is difficult to realize both a function of reducing the thermal conduction and a function of maintaining the space.

CITATION LIST

Patent Literature

Patent Literature 1: JP H11-311069 A

SUMMARY OF INVENTION

An object of the present invention is to provide a manufacturing method of a glass panel unit and a manufacturing method of a glass window including the glass panel unit which easily realize both a reduction of thermal conduction and securing of a space maintaining function.

A manufacturing method of a glass panel unit according to one aspect of the present invention includes an adhesive disposing step, a pillar disposition step, an opposite disposition step, an inside space forming step, a pressure reducing step, and a reduced-pressure space forming step.

The adhesive disposing step is a step of disposing a thermal adhesive to have a frame shape on a first panel including at least a first glass pane.

The pillar disposition step is a step of disposing a plurality of pillars on the first panel. Each of the plurality of pillars includes a plurality of resin layers stacked on each other.

The opposite disposition step is a step of disposing a second panel to face the first panel. The second panel includes at least a second glass pane.

The inside space forming step is a step of heating a glass composite including the first panel, the second panel, and the thermal adhesive to melt the thermal adhesive so as to form an inside space, the inside space being surrounded by the first panel, the second panel, and a melted substance of the thermal adhesive except for an exhaust path which allows gas to be exhausted to an outside space.

The pressure reducing step is a step of exhausting the gas in the inside space to reduce a pressure in the inside space.

The reduced-pressure space forming step is a step of sealing the inside space with a reduced pressure in the inside space being maintained to form a reduced-pressure space hermetically sealed.

In each of the plurality of pillars, one resin layer of the plurality of resin layers is in contact with the first pane, the one resin layer having a contact area in contact with the first panel, the other resin layer of the plurality of resin layers is in contact with the second panel, the other resin layer having a contact area in contact with the second panel, and the contact area of the one resin layer is different from the contact area of the other resin layer.

A manufacturing method of a glass window according to another aspect of the present invention includes a step of fitting a window frame to a glass panel unit manufactured by the manufacturing method of the glass panel unit of the one aspect to manufacture a glass window.

DESCRIPTION OF EMBODIMENTS

First to fourth embodiments below each relate to a glass panel unit (the fourth embodiment further relates to a glass window). In particular, the first to fourth embodiments each relate to a glass panel unit including a first panel, a second panel disposed to face the first panel with a prescribed space from the first panel, and a seal disposed between the first panel and the second panel to hermetically bond the first panel and the second panel together.

Figure 1:
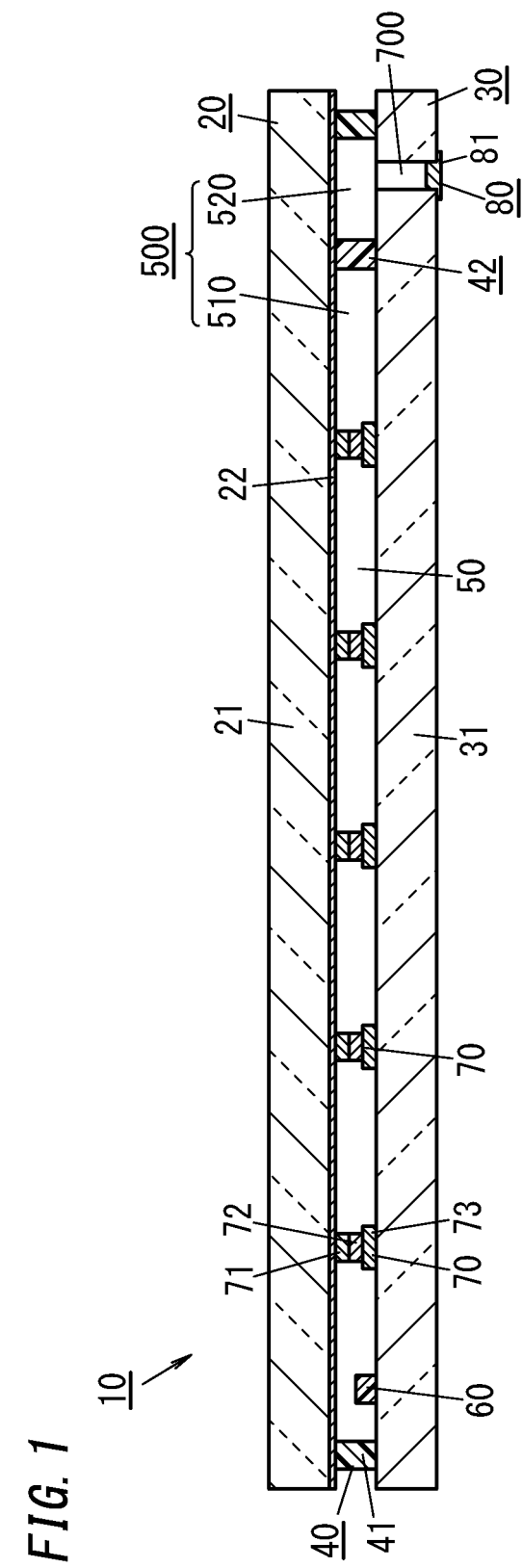
FIG. 1 is a sectional view schematically illustrating a glass panel unit of a first embodiment of the present invention.
Figure 2:
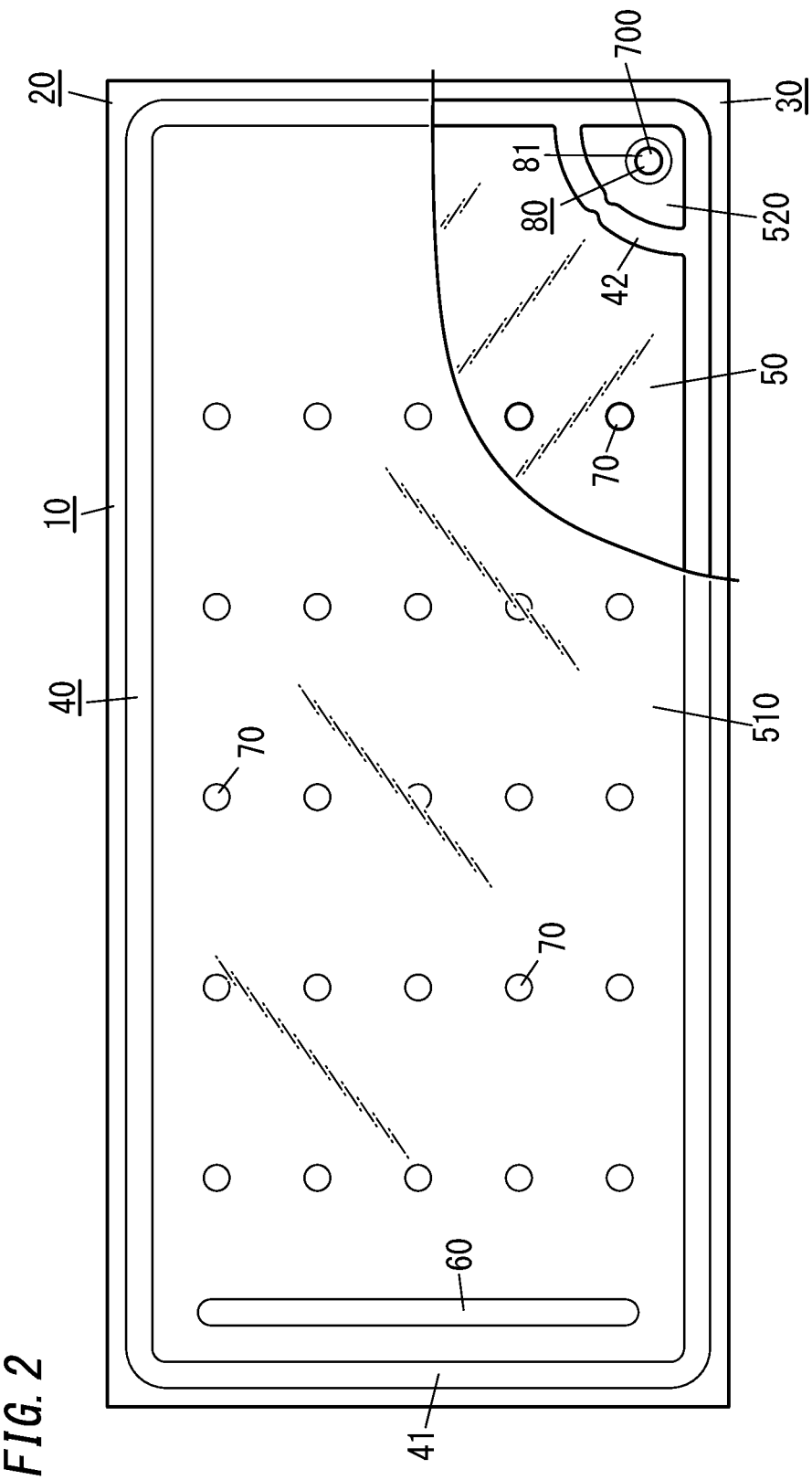
FIG. 2 is a partially cutaway plan view schematically illustrating the glass panel unit.

FIGS. 1 and 2 show a glass panel unit (finished product of a glass panel unit) 10 of the first embodiment. The glass panel unit 10 of the first embodiment is a vacuum insulating glass unit. The vacuum insulating glass unit is an example of an insulated glazing panel including at least a pair of glass panels. The vacuum insulating glass unit has a vacuum space 50 between the pair of glass panels.

The glass panel unit 10 of the first embodiment includes a first panel 20, a second panel 30, a seal 40, a vacuum space 50, a gas adsorbent 60, a plurality of pillars 70, and a closing member 80.

Figure 3:
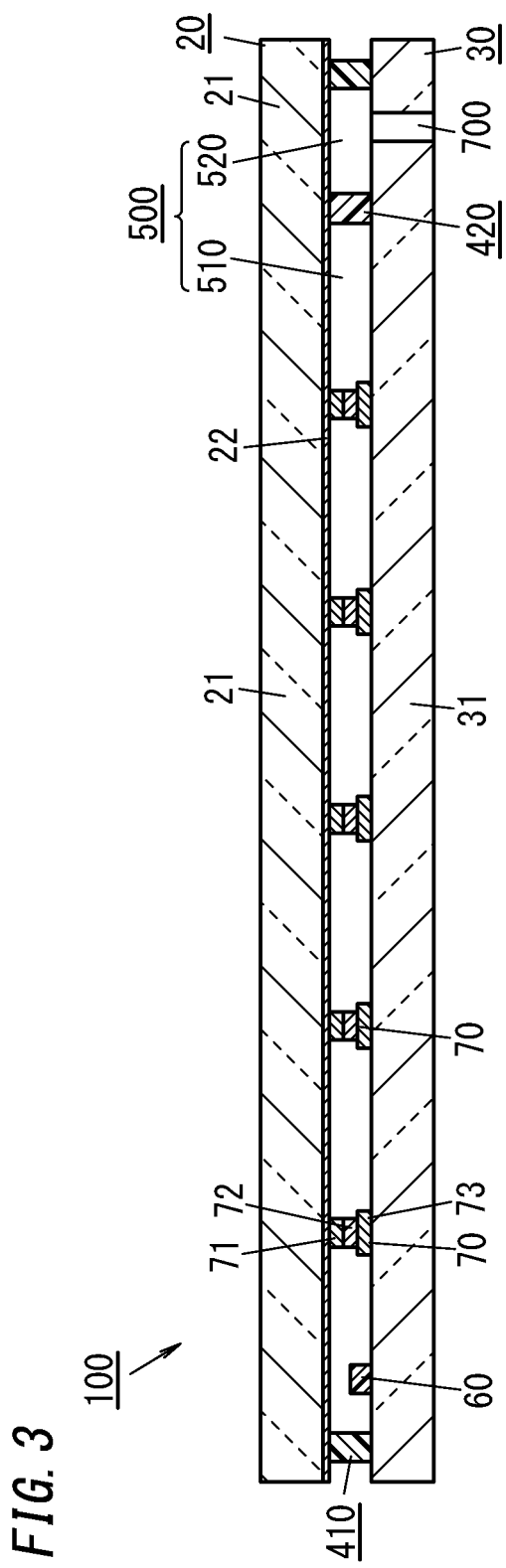
FIG. 3 is a sectional view schematically illustrating a pre-fabricated component from which the glass panel unit will be formed.
Figure 4:
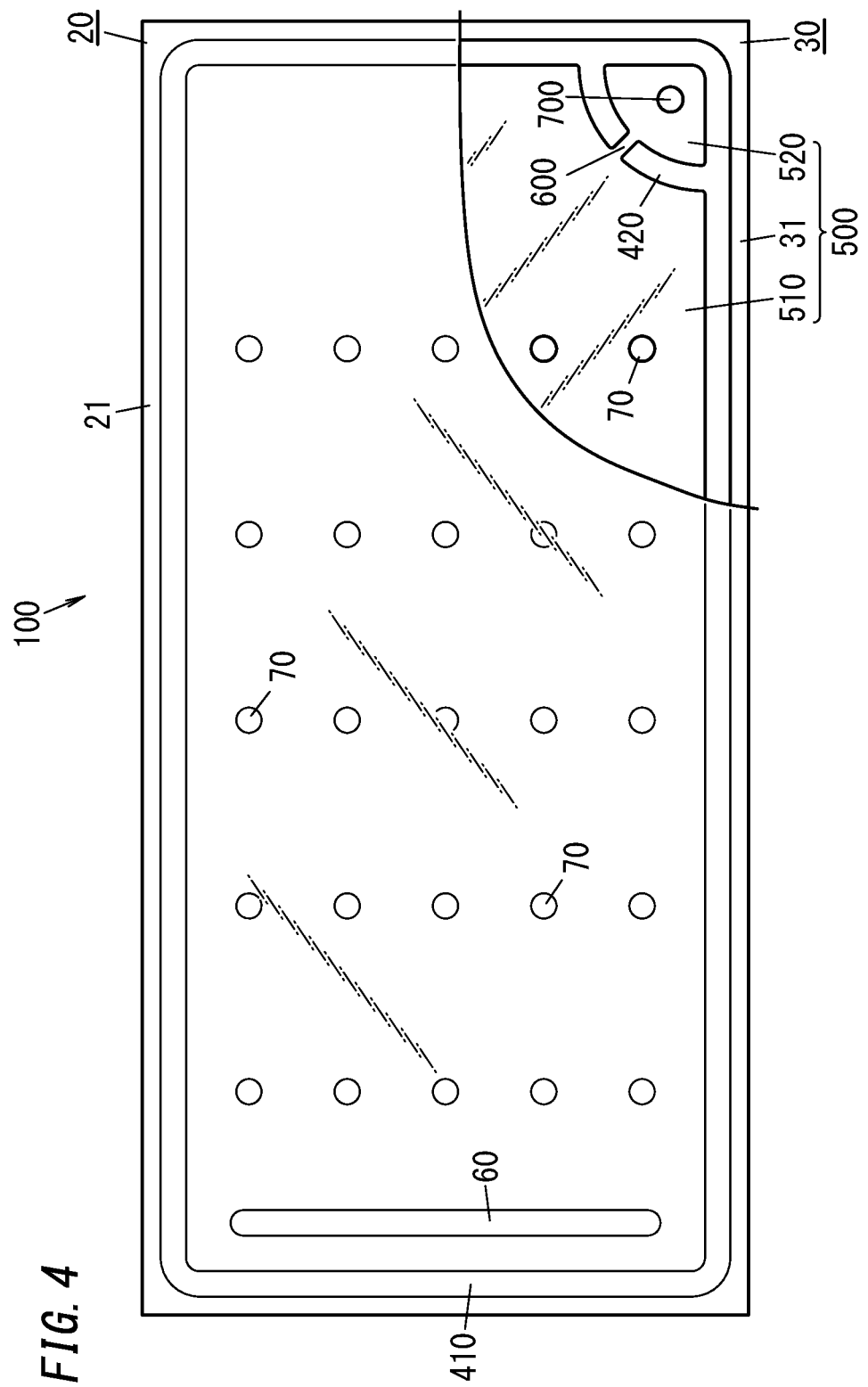
FIG. 4 is a partially cutaway plan view schematically illustrating the pre-fabricated component.

The glass panel unit (finished product) 10 is obtained by performing a prescribed process on a pre-fabricated component 100 shown in FIGS. 3 and 4.

The pre-fabricated component 100 includes the first panel 20, the second panel 30, a frame member 410, an inside space 500, a partition 420, an air passage 600, an exhaust port 700, the gas adsorbent 60, and the plurality of pillars 70.

The first panel 20 includes a first glass pane 21 and a coating 22. The first glass pane 21 defines the planar shape of the first panel 20.

The first glass pane 21 is a rectangular flat plate and has a first surface (a lower surface in FIG. 3) and a second surface (an upper surface in FIG. 3) which are parallel to each other on both sides in a thickness direction of the first glass pane. The first surface and the second surface of the first glass pane 21 are both flat surfaces. Examples of materials for the first glass pane 21 include soda-lime glass, high strain-point glass, chemically strengthened glass, no-alkali glass, quartz glass, Neoceram, and physically strengthened glass.

The coating 22 is formed on the first flat surface of the first glass pane 21. The coating 22 is an infrared reflective film. Note that the coating 22 is not limited to the infrared reflective film but may be a film having a desired physical property. Note that the first panel 20 may include only the first glass pane 21. In sum, the first panel 20 includes at least the first glass pane 21.

The second panel 30 includes a second glass pane 31 which defines the planar shape of the second panel 30. The second glass pane 31 is a rectangular flat plate and has a first surface (an upper surface in FIG. 3) and a second surface (a lower surface in FIG. 3) which are parallel to each other on both sides in a thickness direction of the second glass pane. The first surface and the second surface of the second glass pane 31 are both flat surfaces.

The planar shape and the flat surface size of the second glass pane 31 are the same as those of the first glass pane 21 (that is, the planar shape of the second panel 30 is the same as that of the first panel 20). Moreover, the thickness of the second glass pane 31 is the same as that of, for example, the first glass pane 21. Examples of materials for the second glass pane 31 include soda-lime glass, high strain-point glass, chemically strengthened glass, no-alkali glass, quartz glass, Neoceram, and physically strengthened glass.

The second panel 30 includes only the second glass pane 31. That is, the second glass pane 31 is the second panel 30 itself. Note that a coating may be provided on any one of the surfaces of the second panel 30. The coating is a film such as an infrared reflective film having a desired physical property. In this case, the second panel 30 includes the second glass pane 31 and the coating. In sum, the second panel 30 includes at least the second glass pane 31.

The second panel 30 is disposed to face the first panel 20. Specifically, the first panel 20 and the second panel 30 are disposed such that the first surface of the first glass pane 21 and the first surface of the second glass pane 31 are parallel to each other and face each other.

The frame member 410 is disposed between the first panel 20 and the second panel 30 to hermetically bond the first panel 20 and the second panel 30 together. Thus, the inside space 500 surrounded by the frame member 410, the first panel 20, and the second panel 30 is formed.

The frame member 410 is made of a thermal adhesive (a first thermal adhesive having a first softening point). Examples of the first thermal adhesive include glass frit. Examples of the glass frit include low melting glass frit. Examples of the low melting glass frit include bismuth-based glass frit, lead-based glass frit, and vanadium-based glass frit.

The frame member 410 has a rectangular frame shape. The planar shape of the frame member 410 is the same as that of each of the first glass pane 21 and the second glass pane 31. However, the flat surface size of the frame member 410 is smaller than that of each of the first glass pane 21 and the second glass pane 31. The frame member 410 is formed along an outer periphery of the upper surface of the second panel 30 (the first surface of the second glass pane 31). That is, the frame member 410 is formed to surround almost all area on the second panel 30 (the first surface of the second glass pane 31).

The first panel 20 and the second panel 30 are hermetically bonded together with the frame member 410 by once melting the first thermal adhesive of the frame member 410 at a predetermined temperature (first melting temperature) Tm1 (see FIG. 7) higher than or equal to the first softening point.

The partition 420 is disposed in the inside space 500. The partition 420 partitions the inside space 500 into a hermetically closed space, that is, a first space 510 and an evacuation space, that is, a second space 520. The first space 510 serves as the vacuum space 50 hermetically closed when the glass panel unit 10 is completed. The second space 520 is in communication with the exhaust port 700. The partition 420 is formed on a first end side (right end side in FIG. 4) of the center of the second panel 30 in a length direction (left-right direction in FIG. 4) of the second panel 30 so that the first space 510 is larger than the second space 520.

The partition 420 is made of a thermal adhesive (a second thermal adhesive having a second softening point). Examples of the second thermal adhesive include glass frit. Examples of the glass frit include low melting glass frit. Examples of the low melting glass frit include bismuth-based glass frit, lead-based glass frit, and vanadium-based glass frit. The second thermal adhesive is the same as the first thermal adhesive, and the second softening point is equal to the first softening point.

The exhaust port 700 is a pore through which the second space 520 is in communication with the outside space. The exhaust port 700 is used to evacuate the first space 510 through the second space 520 and the air passage 600. The exhaust port 700 is formed in the second panel 30 to connect the second space 520 and the outside space. Specifically, the exhaust port 700 is located at a corner of the second panel 30. Note that in the first embodiment, the exhaust port 700 is formed in the second panel 30, but the exhaust port 700 may be formed in the first panel 20 or formed in both the first panel 20 and the second panel 30.

The gas adsorbent 60 is disposed in the first space 510. Specifically, the gas adsorbent 60 has an elongated shape and is formed at a second end side (left end side in FIG. 4) in the length direction of the second panel 30 so as to extend along a width direction of the second panel 30. That is, the gas adsorbent 60 is disposed at an end of the first space 510 (vacuum space 50). In this way, the gas adsorbent 60 becomes less noticeable. Moreover, the gas adsorbent 60 is disposed at a location apart from the partition 420 and the air passage 600. Thus, when the first space 510 is evacuated, it is possible to reduce a possibility of the evacuation to be hindered by the gas adsorbent 60.

The gas adsorbent 60 is used to adsorb unnecessary gas (for example, remaining gas). The unnecessary gas is, for example, gas released from the frame member 410 and the partition 420 when the frame member 410 and the partition 420 are heated.

The gas adsorbent 60 contains a getter. The getter is a material having a property of adsorbing molecules smaller than a prescribed size. The getter is, for example, an evaporable getter. The evaporable getter has a property of releasing adsorbed molecules at or higher than a predetermined temperature (activation temperature). Thus, even when the adsorption capacity of the evaporable getter decreases, heating the evaporable getter to or higher than the activation temperature enables the adsorption capacity of the evaporable getter to be recovered. The evaporable getter is, for example, zeolite or ion-exchanged zeolite (e.g., copper ion-exchanged zeolite).

The gas adsorbent 60 contains powder of the getter. Specifically, the gas adsorbent 60 is formed by application of a solution containing powder of a getter dispersed therein. In this case, it is possible to downsize the gas adsorbent 60. Thus, even when the vacuum space 50 is small, it is possible to dispose the gas adsorbent 60.

The plurality of pillars 70 are adopted to maintain a prescribed space between the first panel 20 and the second panel 30. That is, the plurality of pillars 70 serve as spacers for maintaining the distance between the first panel 20 and the second panel 30 to have a desired value.

The plurality of pillars 70 are disposed in the first space 510. Specifically, the plurality of pillars 70 are arranged at respective intersections of a rectangular (square or oblong) grid. For example, the interval between each two of the plurality of pillars 70 is 2 cm. Note that sizes of the pillars 70, the number of pillars 70, the interval between the pillars 70, and the arrangement pattern of the pillars 70 may be accordingly selected.

Figure 5:
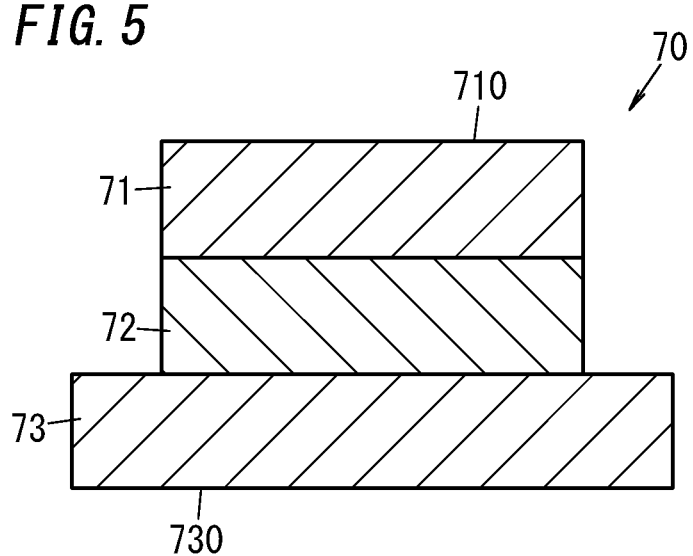
FIG. 5 is a sectional view illustrating a pillar of the glass panel unit.

As illustrated in FIG. 5, each pillar 70 includes a plurality of resin layers 71, 72, and 73. The first embodiment includes three resin layers 71, 72, and 73, but the number of resin layers is not limited.

The cross-sectional area viewed in a thickness direction (up-down direction in FIG. 5) of the resin layer 71 which is in contact with the first panel 20 is the same as the cross-sectional area of the resin layer 72 which is in contact with neither the first panel 20 nor the second panel 30. Here, the cross-sectional area of the resin layer 71 which is in contact with the first panel 20 is the area (contact area) of a contact surface 710 which is in contact with the first panel 20.

Moreover, the cross-sectional area of each of the resin layer 71 and the resin layer 72 is smaller than the cross-sectional area of the resin layer 73 which is in contact with the second panel 30. Here, the cross-sectional area of the resin layer 73 which is in contact with the second panel 30 is the area (contact area) of a contact surface 730 to the second panel 30.

Note that cross-sectional areas of all the resin layers 71, 72, and 73 may differ from one another.

Each pillar 70 is in contact with both the first panel 20 and the second panel 30. Therefore, heat can be conducted via each pillar 70. In terms of the thermal conduction, each pillar 70 preferably has a small cross-sectional area.

Each pillar 70, however, has a function of maintaining the prescribed space between the first panel 20 and the second panel 30. In terms of the function of maintaining the space, each pillar 70 preferably has a large cross-sectional area.

In the first embodiment, a resin layer having a small cross-sectional area (in the first embodiment, the resin layers 71 and 72) reduces the thermal conduction while a resin layer having a large cross-sectional area (in the first embodiment, the resin layer 73) secures the function of maintaining the space between the first panel 20 and the second panel 30. That is, both a reduction of thermal conduction and securing of a space maintaining function are realized.

Each pillar 70 is made of a transparent material. Note that as long as each pillar 70 is sufficiently small, it may be made of a non-transparent material. Materials for each pillar 70 are selected so that each pillar 70 does not deform in a first melting step, an evacuation step, and a second melting step which will be described later. For example, materials for each pillar 70 are selected to have a softening point (softening temperature) higher than the first softening point of the first thermal adhesive and the second softening point of the second thermal adhesive.

The pre-fabricated component 100 is subjected to the prescribed process to obtain the glass panel unit (finished product) 10.

In the prescribed process, the first space 510 is evacuated at a predetermined temperature (exhaust temperature) Te (see FIG. 8) via an exhaust passage so that the first space 510 becomes the vacuum space 50. The exhaust passage includes the air passage 600, the second space 520, and the exhaust port 700 and allows evacuation to the outside space. The exhaust temperature Te is higher than the activation temperature of the getter in the gas adsorbent 60. This enables evacuation of the first space 510 and recovery of the adsorption capacity of the getter to be concurrently performed.

Moreover, as illustrated in FIG. 2, in the prescribed process, the partition 420 is deformed to form a partition wall 42 closing the air passage 600, thereby forming the seal 40 surrounding the vacuum space 50. The partition 420 contains the second thermal adhesive, and therefore, the second thermal adhesive is once melted at a predetermined temperature (second melting temperature) Tm2 (see FIG. 8) higher than or equal to the second softening point, which enables the partition 420 to be deformed to form the partition wall 42. Note that the first melting temperature Tm1 is lower than the second melting temperature Tm2. Thus, when the first panel 20 and the second panel 30 are bonded together with the frame member 410, it is possible to prevent the partition 420 from being deformed to close the air passage 600.

As illustrated in FIG. 2, the partition 420 is deformed to close the air passage 600. The partition wall 42 obtained by thus deforming the partition 420 (spatially) separates the vacuum space 50 from the second space 520. The partition wall (second portion) 42 and a portion (first portion) 41 included in the frame member 410 and corresponding to the vacuum space 50 form the seal 40 surrounding the vacuum space 50.

As illustrated in FIG. 2, the glass panel unit (finished product) 10 thus obtained includes the first panel 20, the second panel 30, the seal 40, the vacuum space 50, the second space 520, the gas adsorbent 60, the plurality of pillars 70, and the closing member 80.

As described above, the vacuum space 50 is formed by evacuating the first space 510 through the second space 520 and the exhaust port 700. In other words, the vacuum space 50 is the first space 510 in which the degree of vacuum is lower than or equal to a prescribed value. The prescribed value is, for example, 0.1 Pa. The vacuum space 50 is fully hermetically sealed with the first panel 20, the second panel 30, and the seal 40 and is thus separated from the second space 520 and the exhaust port 700.

The seal 40 fully surrounds the vacuum space 50 and hermetically bonds the first panel 20 and the second panel 30 together. The seal 40 has a frame shape and includes the first portion 41 and the second portion 42. The first portion 41 is a portion included in the frame member 410 and corresponding to the vacuum space 50. That is, the first portion 41 is a portion which is included in the frame member 410 and which faces the vacuum space 50. The second portion 42 is a partition wall obtained by deforming the partition 420.

The closing member 80 reduces objects such as dust entering the second space 520 through the exhaust port 700. In the first embodiment, the closing member 80 is a cover 81 provided on a front side of the exhaust port 700 formed in the first panel 20 or the second panel 30.

Providing the closing member 80 to the exhaust port 700 reduces objects such as dust entering the second space 520 through the exhaust port 700. This reduces degradation of the appearance of the glass panel unit 10 due to objects such as dust entering the exhaust port 700 or the second space 520. Note that the closing member 80 does not have to be provided.

Next, a manufacturing method of the glass panel unit 10 of the first embodiment will be described with reference to FIGS. 6 and 9.

The manufacturing method of the glass panel unit 10 of the first embodiment includes a preparation process, an assembling process, a hermetically sealing process, and a removal process. Note that the preparation process may be omitted.

The preparation process is a process of forming the first panel 20, the second panel 30, the frame member 410, the partition 420, the inside space 500, the air passage 600, the exhaust port 700, and the gas adsorbent 60 to obtain the pre-fabricated component 100. The preparation process includes first to sixth steps. Note that the orders of the second to sixth steps may be accordingly changed.

The first step is a step (substrate forming step) of forming the first panel 20 and the second panel 30. For example, in the first step, the first panel 20 and the second panel 30 are created. Moreover, in the first step, the first panel 20 and the second panel 30 are washed as necessary.

The second step is a step of forming the exhaust port 700. In the second step, the exhaust port 700 is formed in the second panel 30. Moreover, in the second step, the second panel 30 is washed as necessary.

The third step is a step (seal member forming step) of forming the frame member 410 and the partition 420. In the third step, a material (first thermal adhesive) for the frame member 410 and a material (second thermal adhesive) for the partition 420 are applied to the second panel 30 (first surface of the second glass pane 31) with, for example, a dispenser.

The material for the frame member 410 and the material for the partition 420 are dried and subjected to pre-sintering. For example, the second panel 30 to which the material for the frame member 410 and the material for the partition 420 have been applied is heated. Note that the first panel 20 may be heated together with the second panel 30. That is, the first panel 20 may be heated under the same condition as the condition for the second panel 30. Thus, it is possible to reduce the difference between the warp of the first panel 20 and the warp of the second panel 30.

The fourth step is a step (pillar forming step) of forming the pillars 70. In the fourth step, the plurality of pillars 70 are formed in advance, and the plurality of pillars 70 are arranged respective prescribed positions on the second panel 30 with, for example, a chip mounter. Note that the plurality of pillars 70 may be formed by a photolithography technique and an etching technique. In this case, the plurality of pillars 70 are made of, for example, a photocurable material. Alternatively, the plurality of pillars 70 may be formed by a well-known thin film forming technique.

The fifth step is a step (gas adsorbent forming step) of forming the gas adsorbent 60. In the fifth step, a solution containing powder of the getter dispersed therein is applied to a prescribed location on the second panel 30 and is dried to form the gas adsorbent 60.

Figure 6:
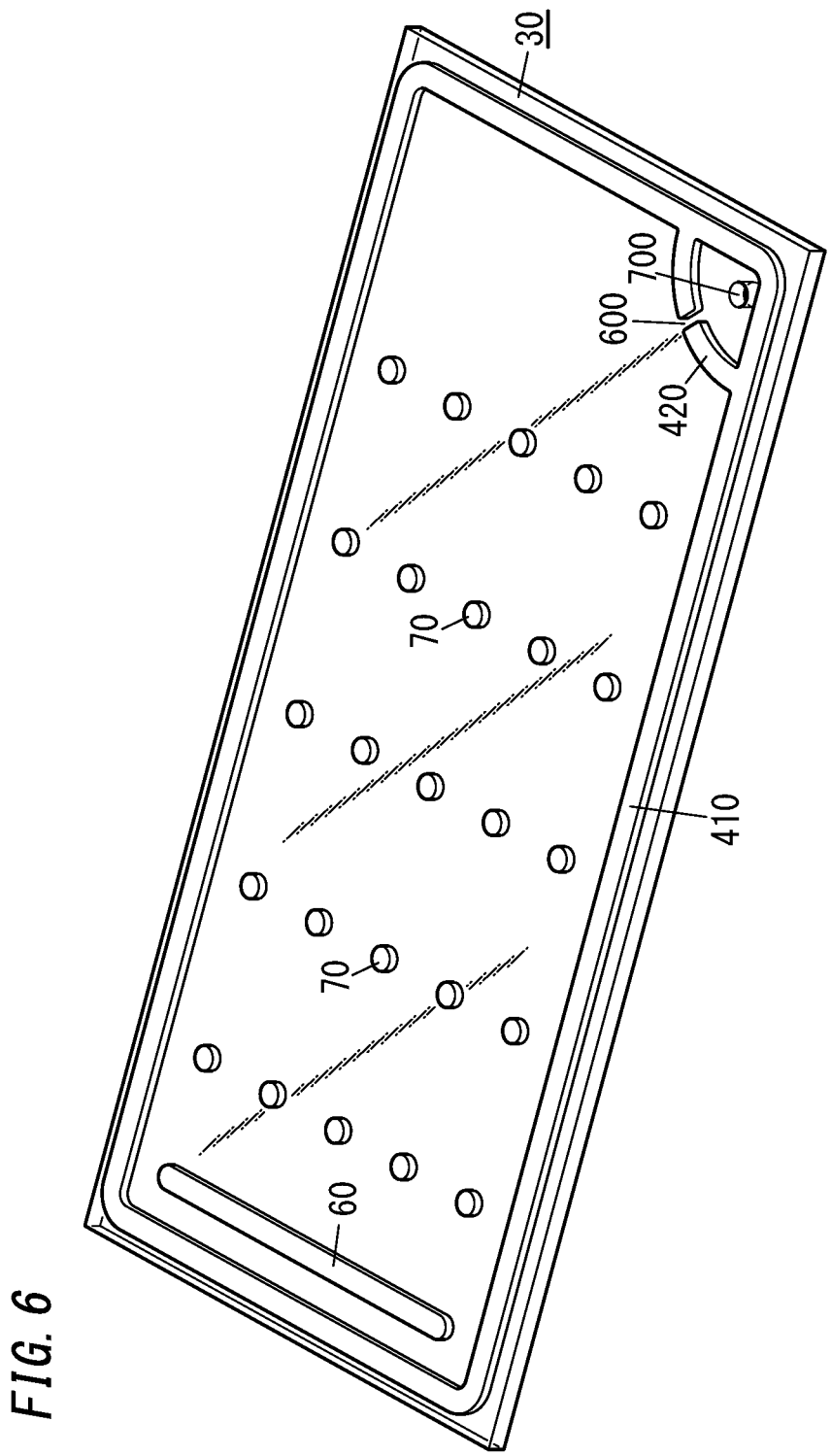
FIG. 6 is a view illustrating a manufacturing method of the glass panel unit.

When the first step to the fifth step are finished, the second panel 30 as illustrated in FIG. 6 is obtained. The second panel 30 includes the frame member 410, the partition 420, the air passage 600, the exhaust port 700, the gas adsorbent 60, and the plurality of pillars 70.

Figure 7:
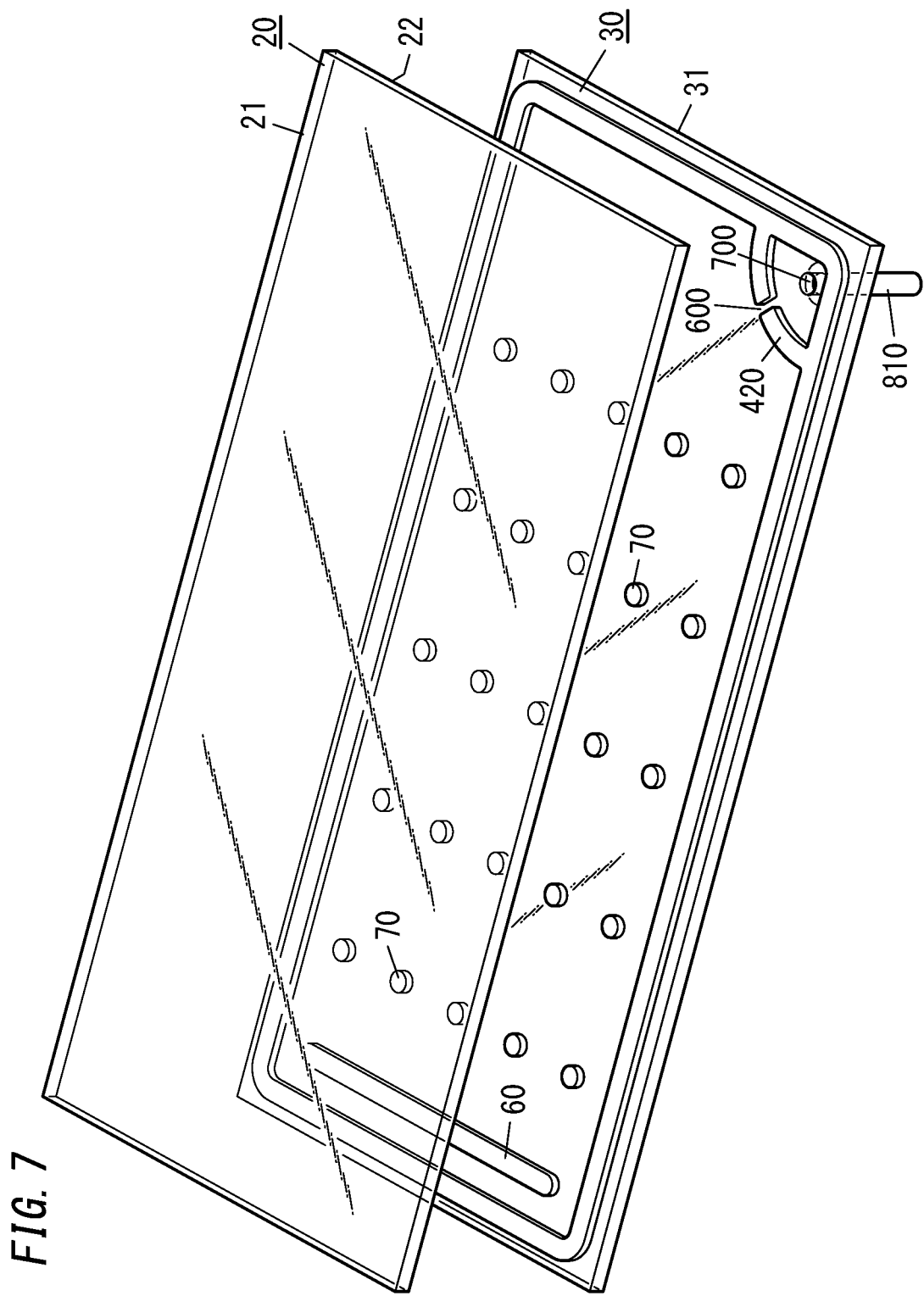
FIG. 7 is a view illustrating the manufacturing method of the glass panel unit.

The sixth step is a step (disposition step) of disposing the first panel 20 and the second panel 30. As illustrated in FIG. 7, in the sixth step, the first panel 20 and the second panel 30 are superimposed on each other such that the first surface of the first glass pane 21 and the first surface of the second glass pane 31 are parallel to each other and face each other.

The assembling process is a process of preparing the pre-fabricated component 100. Specifically, in the assembling process, the first panel 20 and the second panel 30 are bonded together to prepare the pre-fabricated component 100. That is, the assembling process is a step (first melting step) of hermetically bonding the first panel 20 and the second panel 30 together with the frame member 410.

Figure 8:
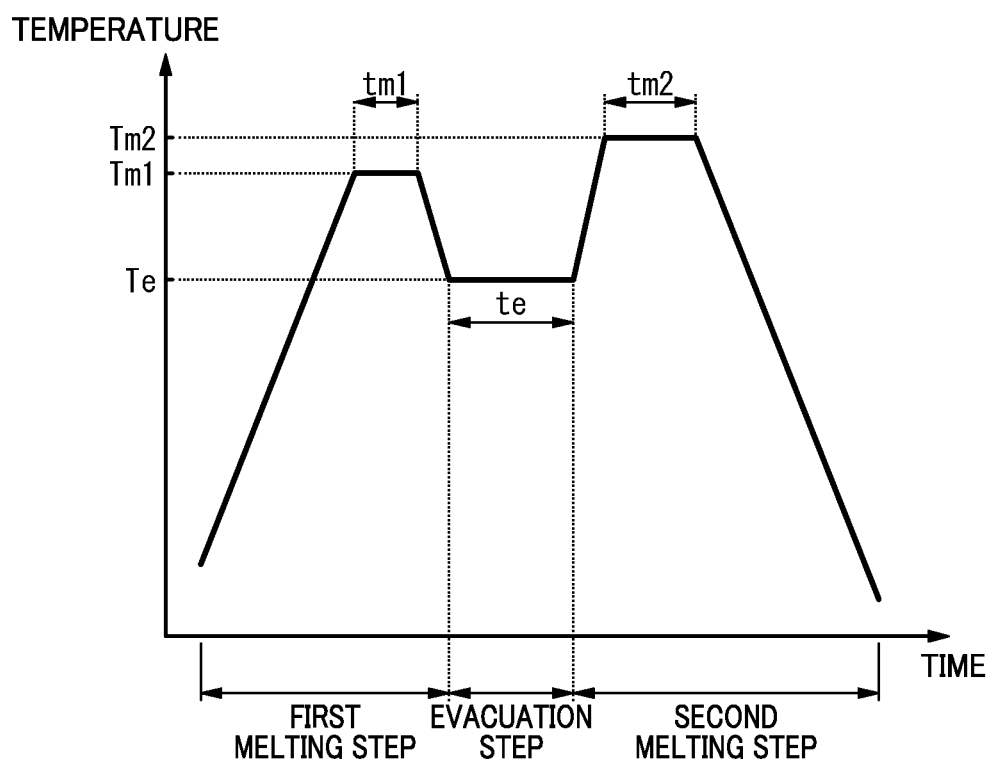
FIG. 8 is a view illustrating the manufacturing method of the glass panel unit.

In the first melting step, the first thermal adhesive is once melted at the predetermined temperature (first melting temperature) Tm1 higher than or equal to the first softening point to hermetically bond the first panel 20 and the second panel 30 together. Specifically, the first panel 20 and the second panel 30 are disposed in a melting furnace and are heated as illustrated in FIG. 8, at the first melting temperature Tm1 for a predetermined time (first melting time) tm1.

The first melting temperature Tm1 and the first melting time tm1 are determined such that the first panel 20 and the second panel 30 are hermetically bonded together with the thermal adhesive of the frame member 410 but the air passage 600 is not closed with the partition 420. That is, the lower limit of the first melting temperature Tm1 is the first softening point, but the upper limit of the first melting temperature Tm1 is determined such that the air passage 600 is not closed with the partition 420. For example, when each of the first softening point and the second softening point is 434° C., the first melting temperature Tm1 is set to 440° C. Moreover, the first melting time tm1 is, for example, 10 minutes. Note that in the first melting step, the frame member 410 releases gas, but the gas is adsorbed on the gas adsorbent 60.

Figure 9:
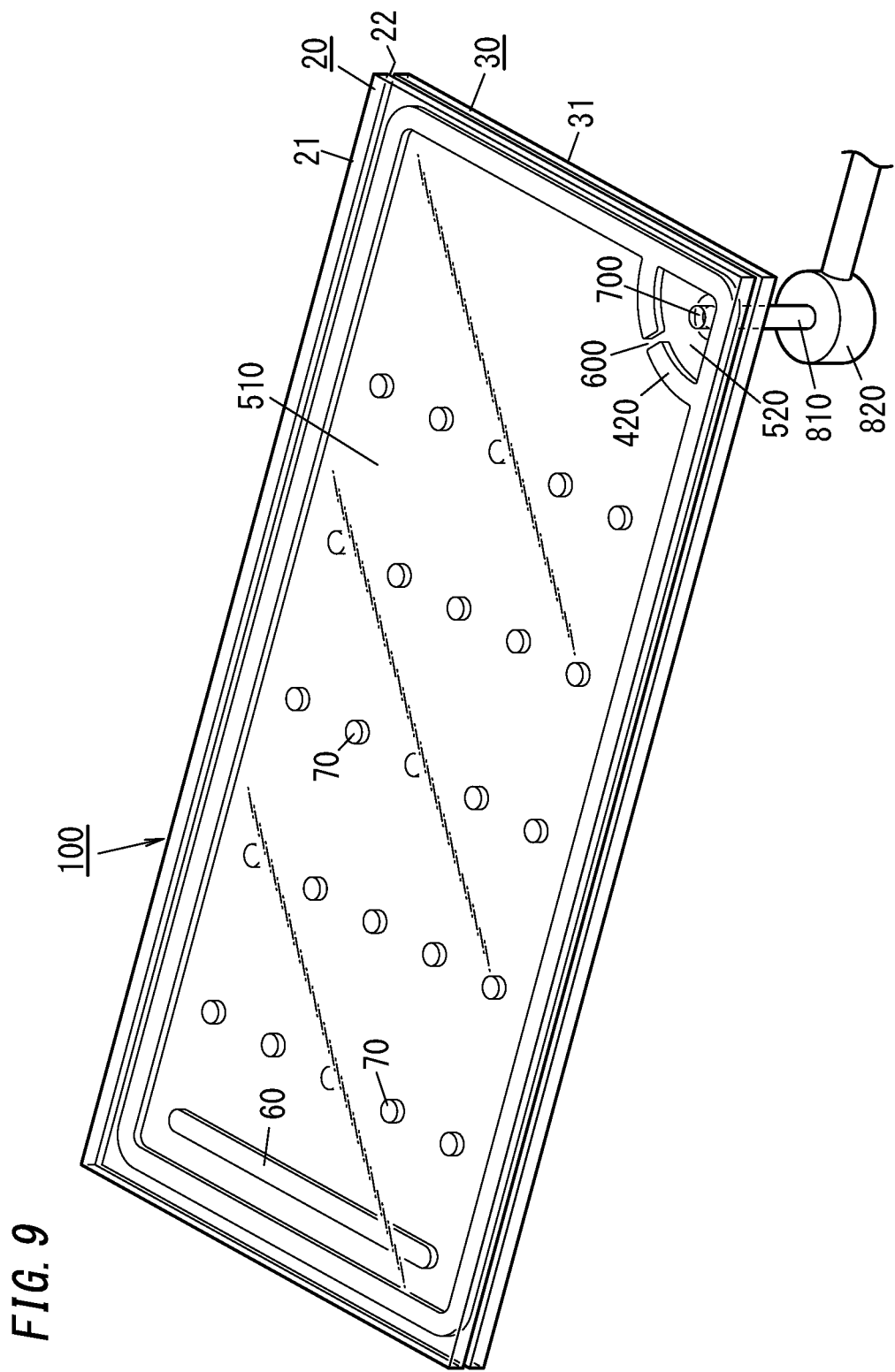
FIG. 9 is a view illustrating the manufacturing method of the glass panel unit.

The assembling process (first melting step) provides the pre-fabricated component 100 shown in FIG. 9.

The hermetically sealing process is a process of performing the prescribed processes on the pre-fabricated component 100 to obtain the glass panel unit (finished product) 10. The hermetically sealing process includes an evacuation step and a melting step (second melting step). That is, the evacuation step and the second melting step correspond to the prescribed processes.

The evacuation step is a step of evacuating the first space 510 at the predetermined temperature (exhaust temperature) Te through the air passage 600, the second space 520, and the exhaust port 700 to obtain the vacuum space 50.

The evacuation is performed with, for example, a vacuum pump. As illustrated in FIG. 9, the vacuum pump is connected via an exhaust pipe 810 and a seal head 820 to the pre-fabricated component 100. The exhaust pipe 810 is joined to the second panel 30, for example, such that the interior of the exhaust pipe 810 is in communication with the exhaust port 700. Then, the seal head 820 is attached to the exhaust pipe 810, thereby connecting an inlet of the vacuum pump to the exhaust port 700.

The first melting step, the evacuation step, and the second melting step are performed while the first panel 20 and the second panel 30 (the second panel 30 including the frame member 410, the partition 420, the air passage 600, the exhaust port 700, the gas adsorbent 60, and the plurality of pillars 70) are placed in the melting furnace. Thus, the exhaust pipe 810 is joined to the second panel 30 at least before the first melting step.

In the evacuation step, the first space 510 is evacuated at the exhaust temperature Te for a predetermined time (evacuation time) te through the air passage 600, the second space 520, and the exhaust port 700 (see FIG. 8).

The exhaust temperature Te is set to a temperature higher than the activation temperature (e.g., 350° C.) of the getter in the gas adsorbent 60 and lower than the first softening point and the second softening point (e.g., 434° C.). For example, the exhaust temperature Te is 390° C.

In this way, the frame member 410 and the partition 420 do not deform. Moreover, the getter in the gas adsorbent 60 is activated, and molecules (gas) adsorbed on the getter are released from the getter. Then, the molecules (i.e., gas) released from the getter are discharged through the first space 510, the air passage 600, the second space 520, and the exhaust port 700. Thus, in the evacuation step, the adsorption capacity of the gas adsorbent 60 is recovered.

The evacuation time te is set such that the vacuum space 50 having a desired degree of vacuum (e.g., degree of vacuum of lower than or equal to 0.1 Pa) is obtained. For example, the evacuation time te is set to 120 minutes.

Note that the degree of vacuum of the vacuum space 50 is not particularly limited. Alternatively, a reduced-pressure space filled with gas at a pressure lower than at least 1 atmospheric pressure, for example, at 0.5 atmospheric pressure may be formed instead of the vacuum space 50.

The second melting step is a step of deforming the partition 420 to form the partition wall 42 closing the air passage 600, thereby forming the seal 40 surrounding the vacuum space 50. In the second melting step, the second thermal adhesive is once melted at the predetermined temperature (second melting temperature) Tm2 higher than or equal to the second softening point to deform the partition 420, thereby forming the partition wall 42. Specifically, the first panel 20 and the second panel 30 are heated in a melting furnace at the second melting temperature Tm2 for a predetermined time (second melting time) tm2 (see FIG. 8).

The second melting temperature Tm2 and the second melting time tm2 are determined such that the second thermal adhesive softens to form the partition wall 42 closing the air passage 600. The lower limit of the second melting temperature Tm2 is the second softening point (434° C.). However, an object of the second melting step, unlike the first melting step, is to deform the partition 420, and therefore, the second melting temperature Tm2 is set to a temperature higher than the first melting temperature (440° C.) Tm1. For example, the second melting temperature Tm2 is set to 460° C. Moreover, the second melting time tm2 is, for example, 30 minutes.

Note that in the first embodiment, the evacuation is performed only in the evacuation step before the second melting step, but the evacuation may be performed in the second melting step.

Moreover, in the second melting step, continuously from the evacuation step, the first space 510 is evacuated through the air passage 600, the second space 520, and the exhaust port 700. That is, in the second melting step, while the first space 510 is evacuated at the second melting temperature Tm2 through the air passage 600, the second space 520, and the exhaust port 700, the partition 420 is deformed to form the partition wall 42 closing the air passage 600. Thus, degradation of the degree of vacuum in the vacuum space 50 during the second melting step is further reduced. Note that in the second melting step, the first space 510 is not necessarily evacuated through the air passage 600, the second space 520, and the exhaust port 700.

After the preparation process, assembling process, hermetically sealing process, and removal process described above, the glass panel unit 10 is obtained.

In the first embodiment, each pillar 70 includes a plurality of resin layers 71, 72, and 73. A contact area being in contact of the first panel 20 and being included in the resin layer 71 which is in contact with the first panel 20 is different from a contact area being in contact with the second panel 30 and being included in the resin layer 73 which is in contact with the second panel 30. In the first embodiment, the contact area of the resin layer 71 that is in contact with the first panel 20 is smaller than the contact area of the resin layer 73 that is in contact with the second panel 30. Thus, the resin layers 71 and 72 each having a small cross-sectional area reduces the thermal conduction while the resin layer 73 having a large cross-sectional area secures the function of maintaining the space between the first panel 20 and the second panel 30, and both a reduction of thermal conduction and securing of a space maintaining function are realized.

Next, a manufacturing method of a glass panel unit 10 of a second embodiment will be described with reference to FIGS. 10A to 10C, and 11. Note that since most elements of the glass panel unit 10 of the second embodiment are substantially the same as those of the glass panel unit 10 of the first embodiment, the description of the same elements is omitted, and differences will be described.

The second embodiment is different from the first embodiment only in the fourth step (pillar disposing step) of the preparation process.

In the second embodiment, the fourth step sequentially includes a setting step, a punching step, and a displacement step.

Figure 10A:
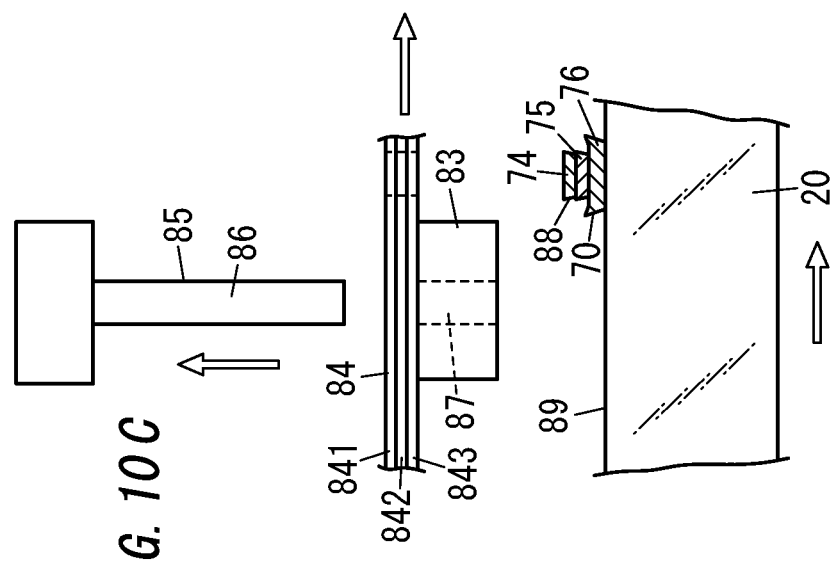
FIG. 10A is a view illustrating a state before a sheet material is punched in a fourth step of a preparation process in a second embodiment of the present invention.

In the setting step shown in FIG. 10A, a first panel 20, a punching die 83, a sheet material 84, and a punch section 85 are set in this order from bottom to top.

The sheet material 84 includes three resin layers 841, 842, and 843 which will respectively be resin layers 74, 75, and 76 of a pillar 70.

The sheet material 84 is put on an upper surface of the punching die 83. A punch 86 included in the punch section 85 is located directly above a through hole 87 in the punching die 83 with the sheet material 84 placed between the punch 86 and the punching die 83.

Figure 10B:
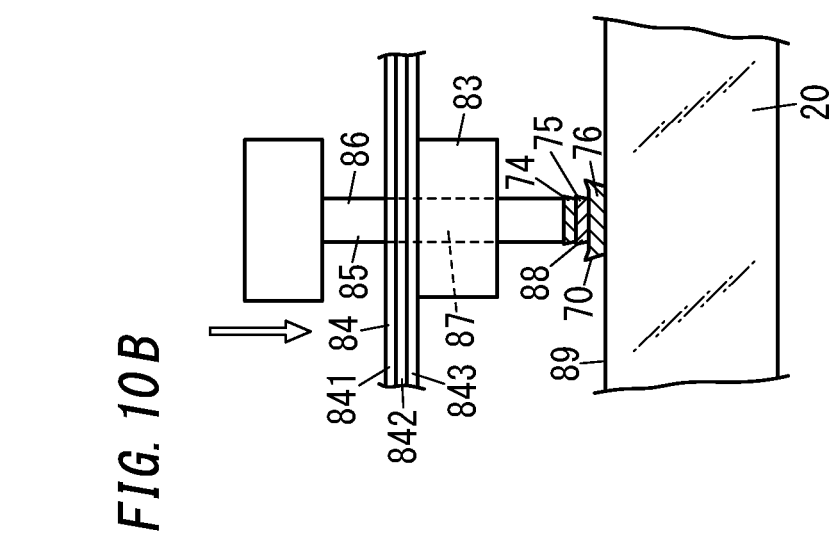
FIG. 10B is a view illustrating a state after the sheet material is punched in the fourth step.

In the punching step shown in FIG. 10B, the punch section 85 is driven downward along a linear track. The punch section 85 is driven downward, thereby punching out a part 88 of the sheet material 84 by the punch 86 having a columnar shape through the through hole 87 in the punching die 83 downward (see the void arrow in FIG. 10B).

Figure 11:
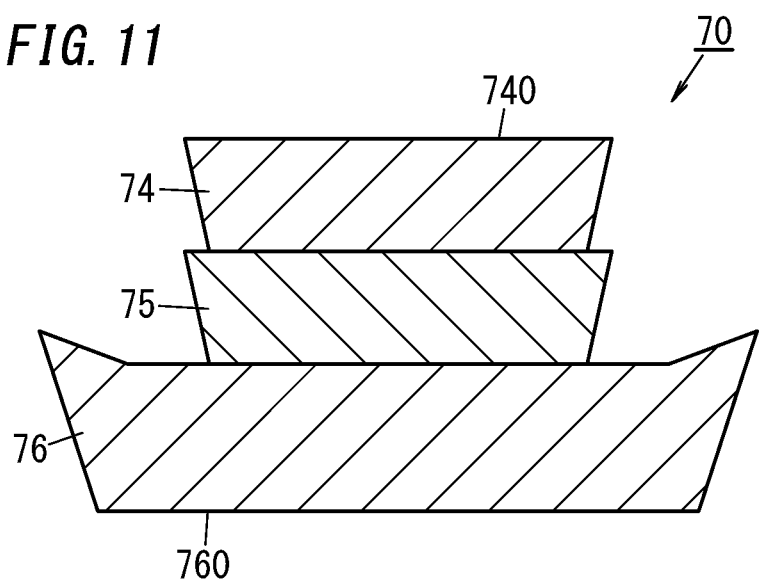
FIG. 11 is a sectional view illustrating a pillar of a glass panel unit of the second embodiment.

The part 88 thus punched out has the shape as shown in FIG. 11 and serves as the pillar 70 including the plurality of resin layers 74, 75, and 76. In the second embodiment, the resin layer 74 which is in contact with the first panel 20 has a contact surface 740 that is contact with the first panel 20, and the area (contact area) of the contact surface 740 is equal to the cross-sectional area of the resin layer 75 which is in contact with neither the first panel 20 nor the second panel 30. The resin layer 76 which is in contact with the second panel 30 has a contact surface 760 that is in contact with the second panel 30, and the cross-sectional area of each of the resin layer 74 and the resin layer 75 is smaller than the area (contact area) of the contact surface 760.

Moreover, the cross-sectional area of each of the resin layers 74, 75, and 76 continuously decreases toward the first panel 20 (lower side in FIG. 11) and continuously increases toward an opposite side of the first panel 20 (upper side in FIG. 11).

The part 88 of the sheet material 84 punched out by the punch 86 is pressed onto one surface 89 of the first panel 20 with the part 88 abutting a tip surface of the punch 86.

The part 88 of the sheet material 84 is pressed onto the one surface 89 of the first panel 20 by the tip surface of the punch 86 for a predetermined time at a prescribed pressure, thereby being prefixed to the one surface 89. The part 88 of the sheet material 84 thus prefixed is included in the pillar 70 on the one surface 89.

Figure 10C:
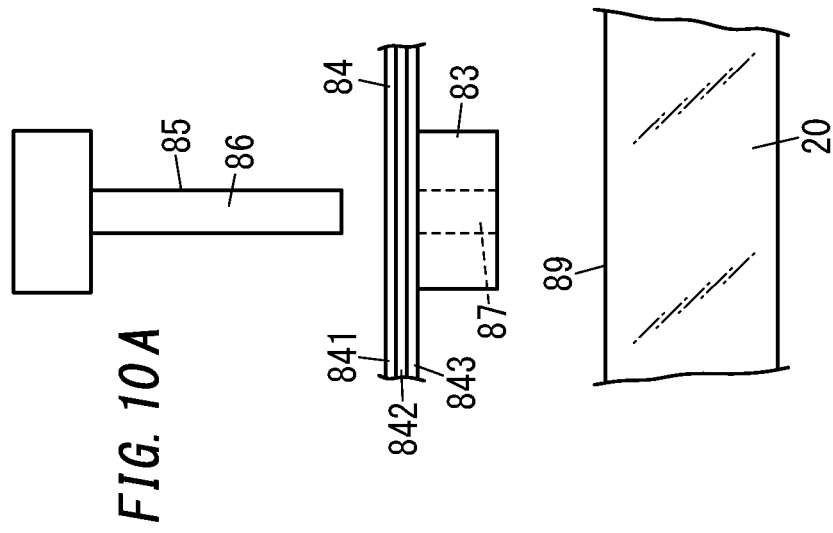
FIG. 10C is a view illustrating movement of the sheet material after the sheet material is punched in the fourth step.

In the displacement step shown in FIG. 10C, as illustrated in the void arrows, the punch section 85 moves upward, and then, the first panel 20 and the sheet material 84 move in the horizontal direction. In the first embodiment, the travel direction of the first panel 20 and the travel direction of the sheet material 84 are the same, but the travel direction of the first panel 20 and the travel direction of the sheet material 84 may be different from each other.

Also in the second embodiment, the resin layers 74 and 75 each having a small cross-sectional area reduce the thermal conduction while the resin layer 76 having a large cross-sectional area secures the function of maintaining the space between the first panel 20 and the second panel 30, and both a reduction of thermal conduction and securing of a space maintaining function are realized.

Moreover, punching the sheet material 84 easily enables the pillar 70 to be formed, wherein a contact area being in contact with the first panel 20 and being included in the resin layer 74 which is in contact with the first panel 20 is different from a contact area being in contact with the second panel 30 and being included in the resin layer 76 which is in contact with the second panel 30.

Figure 12:
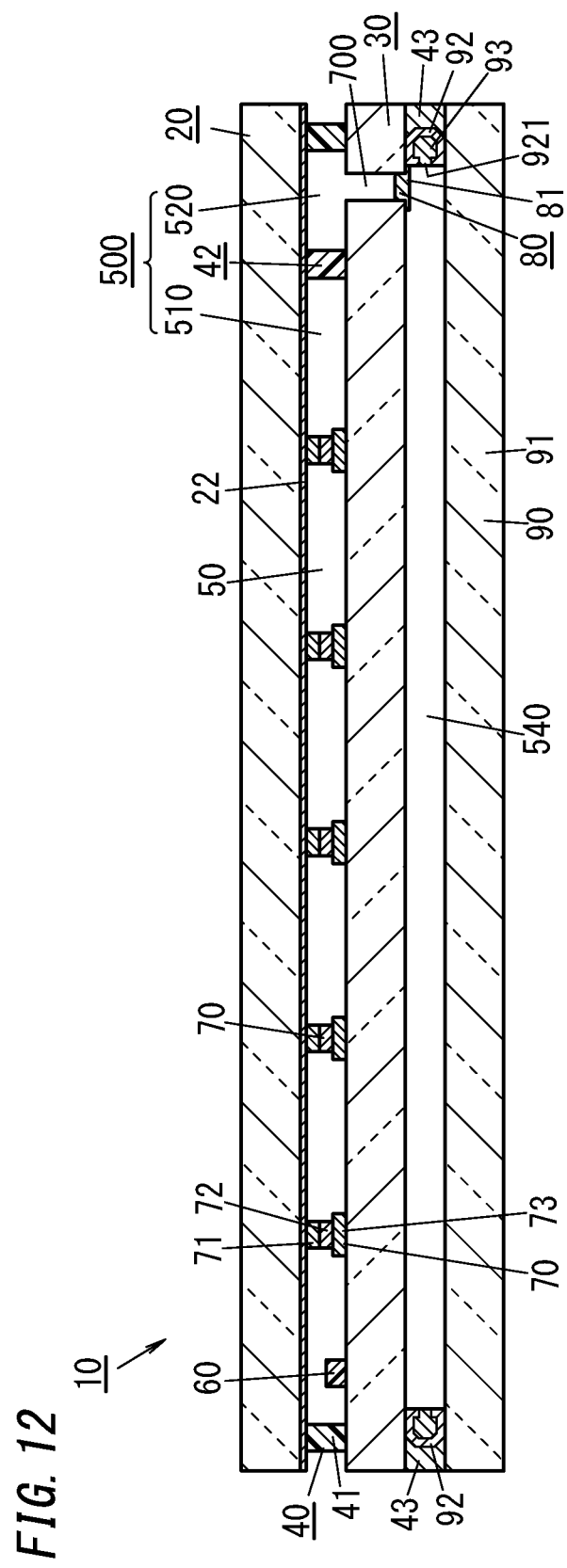
FIG. 12 is a sectional view schematically illustrating a glass panel unit of a third embodiment of the present invention.
Figure 13:
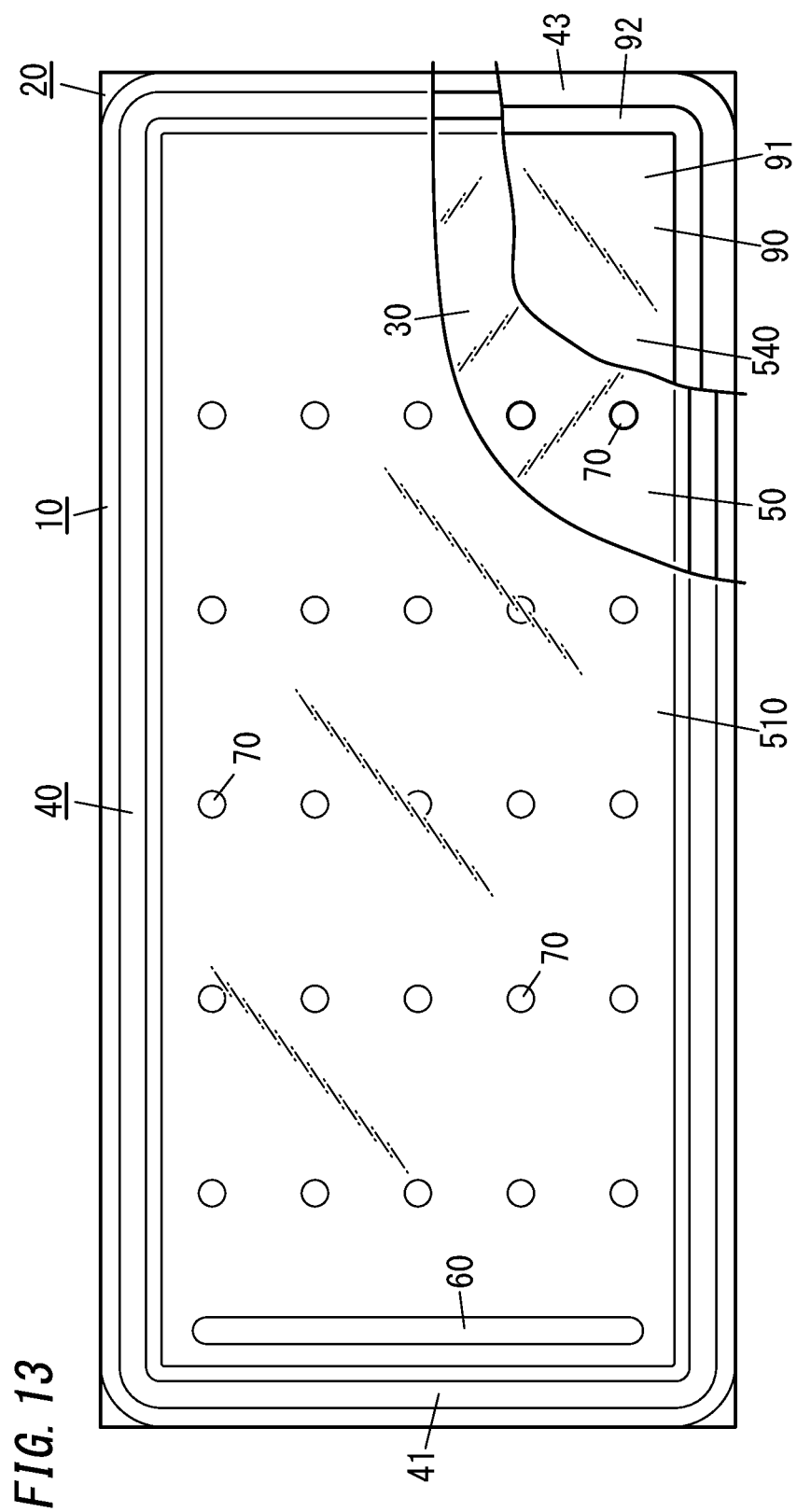
FIG. 13 is a partially cutaway plan view schematically illustrating the glass panel unit of the third embodiment.

Next, a glass panel unit 10 of a third embodiment will be described with reference to FIGS. 12 and 13. Note that the glass panel unit 10 according to the third embodiment includes components in addition to the components in the first embodiment or the second embodiment.

The glass panel unit 10 of the third embodiment includes a third panel 90 disposed to face a second panel 30. Note that in the third embodiment, the third panel 90 faces the second panel 30 for the sake of convenience but may face a first panel 20.

The third panel 90 includes a third glass pane 91. The third glass pane 91 included in the third panel 90 has a flat surface and a predetermined thickness. In the third embodiment, the third glass pane 91 forms the third panel 90.

Note that a coating may be provided on any one of surfaces of the third panel 90. The coating is a film such as an infrared reflective film having a desired physical property. In this case, the third panel 90 includes the third glass pane 91 and the coating. In sum, the third panel 90 includes at least the third glass pane 91.

Moreover, the glass panel unit 10 includes a second seal 43 disposed between the second panel 30 and the third panel 90 to hermetically bond the second panel 30 and the third panel 90 together. Note that in this case, a seal 40 is a first seal. The second seal 43 is disposed to have an annular shape between a peripheral portion of the second panel 30 and a peripheral portion of the third panel 90. The second seal 43 may be made of a material similar to or different from that for the seal 40.

The glass panel unit 10 has a second inside space 540 hermetically closed with the second panel 30, the third panel 90, and the second seal 43 and filled with a drying gas. Note that in this case, an inside space 500 is a first inside space. As a drying gas, a noble gas such as argon, dry air, or the like is used but is not limited to this example.

Moreover, on an inner side of the second seal 43 between the peripheral portion of the second panel 30 and the peripheral portion of the third panel 90, a frame member 92 having a hollow is disposed to have an annular shape. The frame member 92 has a through hole 921 which is in communication with the second inside space 540, and in the frame member 92, desiccant 93 such as silica gel is accommodated.

Moreover, the second panel 30 and the third panel 90 may be bonded together in a manner similar to the bonding of the first panel 20 and the second panel 30, and an example is described below.

First, the third panel 90 and an assembly element (the glass panel unit 10 in the first embodiment or the second embodiment) including the first panel 20 and the second panel 30 are prepared.

A second thermal adhesive which will be the second seal 43 is disposed on a peripheral portion of a surface of the third panel 90 or the second panel 30 to have a frame shape (second thermal adhesive disposing step). The thermal adhesive may be made of a material similar to or different from a thermal adhesive (first thermal adhesive) which will be a frame member 410. In this step, an air passage (second air passage) as a through hole through which the second inside space 540 is in communication with the outside space is formed in the thermal adhesive.

Then, the third panel 90 and the second panel 30 are disposed to face each other (third panel opposite disposition step).

Next, a temperature is increased to a temperature at which the thermal adhesive which will be the second seal 43 melts to once melt the thermal adhesive, thereby hermetically bonding the second panel 30 and the third panel 90 with the second seal 43 (connection step). Note that at this time, the second air passage is not fully closed.

Then, a drying gas is introduced into the second inside space 540 through the second air passage (drying gas feeding step). In this step, the second inside space 540 may be filled with only the drying gas, or air may be left in the second inside space 540.

Then, the second seal 43 is heated to close the second air passage so as to seal the second inside space 540 (second space sealing step).

Thus, the glass panel unit 10 is formed. The glass panel unit 10 of the third embodiment provides a further improved thermal insulation property.

Figure 14:
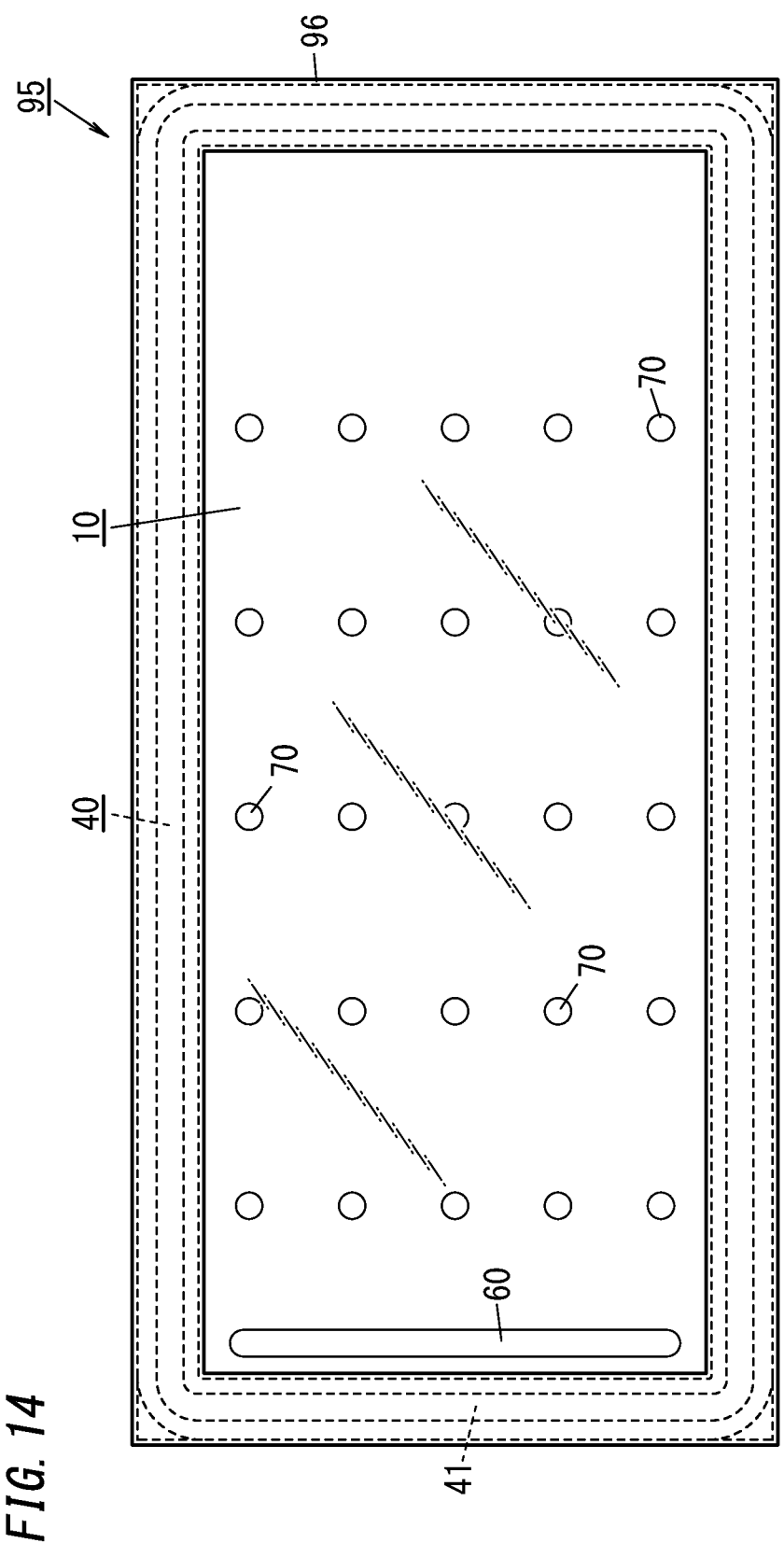
FIG. 14 is a plan view schematically illustrating a glass window including a glass panel unit of a fourth embodiment of the present invention.

Next, a fourth embodiment will be described with reference to FIG. 14. Note that the fourth embodiment is a glass window 95 including the glass panel unit 10 of any one of the first to third embodiments.

The fourth embodiment adopts a glass panel unit 10 similar to that of any of first to third embodiments, and a window frame 96 having a U-shaped cross section is fit to an outer side of the peripheral portion of the glass panel unit 10, thereby forming the glass window 95.

The glass window 95 of the fourth embodiment provides a further improved thermal insulation property.

In the embodiments (i.e., the first embodiments to the fourth embodiments; the same applies to the following description), the glass panel unit 10 has a rectangular shape, but the glass panel unit 10 may have a desired shape such as a round shape or a polygonal shape. That is, the first panel 20, the second panel 30, and the seal 40 do not have to have a rectangular shape, but may have a desired shape such as a round shape or a polygonal shape. Note that the shape of each of the first panel 20, the second panel 30, the frame member 410, and the partition wall 42 is not limited to the shape in the embodiments, but may have a shape that provides a glass panel unit 10 having a desired shape. Note that the shape and/or the size of the glass panel unit 10 is determined based on the application of the glass panel unit 10.

The first surface and the second surface of the first glass pane 21 of the first pane 20 are not limited to flat surfaces. Similarly, the first surface and the second surface of the second glass pane 31 of the second panel 30 are not limited to flat surfaces.

The first glass pane 21 of the first panel 20 and the second glass pane 31 of the second panel 30 do not have to have the same planar shape and flat surface size. The first glass pane 21 and the second glass pane 31 do not have to have the same thickness. The first glass pane 21 and the second glass pane 31 do not have to be made of the same material.

The seal 40 does not have to have the same planar shape as the first panel 20 and the second panel 30. Similarly, the frame member 410 does not have to have the same planar shape as the first panel 20 and the second panel 30.

The first panel 20 may further include a coating having a desired physical property and formed on the second flat surface of the first glass pane 21. Alternatively, the first panel 20 does not have to be provided with the coating 22. That is, the first panel 20 may include only the first glass pane 21.

The second panel 30 may further include a coating having a desired physical property. The coating includes at least one of thin films formed, for example, on the first flat surface and the second flat surface of the second glass pane 31. Examples of the coating include an infrared reflective film and an ultraviolet reflecting film which reflect light having a prescribed wavelength.

In the embodiments, the frame member 410 is made of a first thermal adhesive. Note that the frame member 410 may include another element such as a core material in addition to the first thermal adhesive. That is, the frame member 410 includes at least the first thermal adhesive. Moreover, in the embodiments, the frame member 410 is formed to surround almost all areas of the second panel 30. However, the frame member 410 is formed to surround at least a prescribed area on the second panel 30. That is, the frame member 410 does not have to be formed to surround almost all areas of the second panel 30.

In the embodiments, the partition 420 is made of the second thermal adhesive. Note that the partition 420 may include another element such as a core material in addition to the second thermal adhesive. That is, the partition 420 includes at least the second thermal adhesive.

In the embodiments, the inside space 500 is partitioned into one first space 510 and one second space 520. However, the inside space 500 may be partitioned into one or more first spaces 510 and one or more second spaces 520.

In the embodiments, the second thermal adhesive is the same as the first thermal adhesive, and the second softening point is equal to the first softening point. However, the second thermal adhesive may be a material different from the first thermal adhesive. For example, the second thermal adhesive may have a second softening point different from the first softening point of the first thermal adhesive. Here, the second softening point is preferably higher than the first softening point. In this case, the first melting temperature $Tm1$ may be higher than or equal to the first softening point and lower than the second softening point. In this way, it is possible to prevent the partition 420 from being deformed in the first melting step.

Moreover, the first thermal adhesive and the second thermal adhesive are not limited to the glass frit but may be, for example, low-melting-point metal or a hot-melt adhesive material.

The embodiment adopts a melting furnace to heat the frame member 410, the gas adsorbent 60, and the partition 420. However, heating may be performed by an appropriate heating means. The heating means is, for example, laser or a heat transfer board connected to a heat source.

In the embodiments, the exhaust port 700 is formed in the second panel 30. However, the exhaust port 700 may be formed in the first glass pane 21 of the first panel 20 or in the frame member 410.

As can be seen from the first to fourth embodiments described above, a manufacturing method of a glass panel unit 10 of a first aspect according to the present invention includes an adhesive disposing step, a pillar disposition step, an opposite disposition step, an inside space forming step, a pressure reducing step, and a reduced-pressure space forming step.

The adhesive disposing step is a step of disposing a thermal adhesive to have a frame shape on a first panel 20 including at least a first glass pane 21.

The pillar disposition step is a step of disposing a plurality of pillars 70 on the first panel 20, each of the plurality of pillars 70 including a plurality of resin layers 71 to 73 or 74 to 76 stacked on one other.

The opposite disposition step is a step of disposing a second panel 30 to face the first panel 20. The second panel 30 includes at least a second glass pane 31.

The inside space forming step is a step of heating a glass composite including the first panel 20, the second panel 30, and the thermal adhesive to melt the thermal adhesive so as to form an inside space 500. The inside space 500 is surrounded by the first panel 20, the second panel 30, and a melted substance of the thermal adhesive except for an exhaust path which allows gas to be exhausted to an outside space.

The pressure reducing step is a step of exhausting the gas in the inside space 500 to reduce a pressure in the inside space 500.

The reduced-pressure space forming step is a step of sealing the inside space 500 with a reduced pressure in the inside space being maintained to form a reduced-pressure space hermetically sealed.

In each of the plurality of pillars 70, the resin layer 71 or 74 is in contact with the first panel 20, and the resin layer 73 or 76 is in contact with the second panel 30. The resin layer 71 or 74 has a contact area in contact with the first panel 20. The resin layer 73 or 76 has a contact area in contact with the second panel 30. The contact area of the resin layer 71 or 74 is different from the contact area of the resin layer 73 or 76.

According to the manufacturing method of the glass panel unit 10 of the first aspect, in each of the plurality of pillars 70, the resin layer 71 or 74 is in contact with the first panel 20, and the resin layer 73 or 76 is in contact with the second panel 30. The resin layer 71 or 74 has a contact area in contact with the first panel 20. The resin layer 73 or 76 has a contact area in contact with the second panel 30. The contact area of the resin layer 71 or 74 is different from the contact area of the resin layer 73 or 76. Thus, the resin layers 73 or 76 each having a small cross-sectional area reduces the thermal conduction while the resin layer 71 or 74 having a large cross-sectional area secures the function of maintaining the space between the first panel 20 and the second panel 30, and both a reduction of thermal conduction and securing of a space maintaining function are easily realized.

A manufacturing method of a glass panel unit 10 of a second aspect according to the present invention is realized in combination with the first aspect. In the second aspect, the disposition step of pillars 70 includes a setting step and a punching step.

In the setting step, the first panel 20, the punching die 83 having a through hole 87, a sheet material 84 including the plurality of resin layers 74 to 76 stacked on one another, and a punch section 85 are sequentially placed in this order.

In the punching step, the punch section 85 is driven into the sheet material 84 to punch out a part of the sheet material 84 through the through hole 87 in the punching die 83, and the part of the sheet material 84 punched out is disposed on the first panel 20 by the punch section 85, the part of the sheet material 84 forming the pillar 70.

In the manufacturing method of the glass panel unit 10 of the second aspect, punching the sheet material 84 easily enables the pillar 70 to be formed, wherein a contact area being in contact with the first panel 20 and being included in the resin layer 71 or 74 which is in contact with the first panel 20 is different from a contact area being in contact with the second panel 30 and being included in the resin layer 73 or 76 which is in contact with the second panel 30.

A manufacturing method of a glass panel unit 10 of a third aspect according to the present invention is realized in combination with the first aspect. The manufacturing method of the glass panel unit 10 of the third aspect further includes a second inside space forming step.

In the second inside space forming step, a second thermal adhesive is disposed between a third panel 90 and either the first panel 20 or the second panel 30. The third panel 90 includes at least third glass pane 91. Thus, in the second inside space forming step, a second inside space 540 is formed. The second inside space is surrounded by the third panel 90, either the first panel 20 or the second panel 30, and the second thermal adhesive.

The manufacturing method of the glass panel unit 10 of the third aspect enables a glass panel unit 10 having further improved thermal insulation properties to be manufactured.

A manufacturing method of a glass window 95 of a fourth aspect according to the present invention includes a step of fitting a window frame 96 to the glass panel unit 10 manufactured by the manufacturing method according to any one of the first to third aspects to manufacture a glass window 95.

The manufacturing method of the glass window 95 of the fourth aspect enables a glass window 95 having further improved thermal insulation properties to be manufactured.

REFERENCE SIGNS LIST

10 GLASS PANEL UNIT
20 FIRST PANEL
21 FIRST GLASS PANE
30 SECOND PANEL
31 SECOND GLASS PANE
70 PILLAR
71 to 73 RESIN LAYER
74 to 76 RESIN LAYER
90 THIRD PANEL
91 THIRD GLASS PANE
95 GLASS WINDOW
96 WINDOW FRAME
500 INSIDE SPACE
540 SECOND INSIDE SPACE

The invention claimed is:

1. A manufacturing method of a glass panel unit, comprising:
   an adhesive disposing step of disposing a thermal adhesive to have a frame shape on a first panel including at least a first glass pane;
   a pillar disposition step of disposing a plurality of pillars on the first panel, each of the plurality of pillars including three resin layers stacked on each other;
   an opposite disposition step of disposing a second panel to face the first panel, the second panel including at least a second glass pane;
   an inside space forming step of heating a glass composite including the first panel, the second panel, and the thermal adhesive to melt the thermal adhesive so as to form an inside space, the inside space being surrounded by the first panel, the second panel, and a melted substance of the thermal adhesive except for an exhaust path which allows gas to be exhausted to an outside space;
   a pressure reducing step of exhausting the gas in the inside space to reduce a pressure in the inside space; and
   a reduced-pressure space forming step of sealing the inside space with a reduced pressure in the inside space being maintained to form a reduced-pressure space hermetically sealed, wherein
   in each of the plurality of the pillars, a first resin layer of the three resin layers is in contact with the first panel, the first resin layer having a contact area in contact with the first panel,
a second resin layer of the three resin layers is in contact with neither the first panel nor the second panel,
a third resin layer of the three resin layers is in contact with the second panel, the third resin layer having a contact area in contact with the second panel,
the contact area of the first resin layer is the same as the cross-sectional area of the second resin layer, and
the contact area of the first resin layer and the cross-sectional area of the second resin layer are smaller than the contact area of the third resin layer.

2. The manufacturing method of the glass panel unit according to claim 1, wherein
the pillar disposition step includes:
a setting step of sequentially placing the first panel, the punching die having a through hole, a sheet material including the three resin layers stacked on each other, and a punch section in this order, and
a punching step of driving the punch section into the sheet material to punch out a part of the sheet material through the through hole in the punching die and disposing the part of the sheet material punched out on the first panel by the punch section, the part of the sheet material forming the pillar.

3. The manufacturing method of the glass panel unit according to claim 1, further comprising a second inside space forming step of disposing a second thermal adhesive between a third panel and either the first panel or the second panel to form a second inside space, the third panel including at least a third glass pane, the second inside space being surrounded by the third panel, either the first panel or the second panel, and the second thermal adhesive.

4. The manufacturing method of the glass panel unit according to claim 2, further comprising a second inside space forming step of disposing a second thermal adhesive between a third panel and either the first panel or the second panel to form a second inside space, the third panel including at least a third glass pane, the second inside space being surrounded by the third panel, either the first panel or the second panel, and the second thermal adhesive.

5. A manufacturing method of a glass window comprising a step of fitting a window frame to a glass panel unit manufactured by the manufacturing method of the glass panel unit according to claim 1 to manufacture a glass window.

6. A manufacturing method of a glass window comprising a step of fitting a window frame to a glass panel unit manufactured by the manufacturing method of the glass panel unit according to claim 2 to manufacture a glass window.

7. A manufacturing method of a glass window comprising a step of fitting a window frame to a glass panel unit manufactured by the manufacturing method of the glass panel unit according to claim 3 to manufacture a glass window.

* * * * *